United States Patent
Strano et al.

(10) Patent No.: US 10,181,196 B2
(45) Date of Patent: Jan. 15, 2019

(54) TRAILER TRACKING APPARATUS AND METHOD

(71) Applicant: Jaguar Land Rover Limited, Coventry, Warwickshire (GB)

(72) Inventors: Giovanni Strano, Coventry (GB); Jeremy Greenwood, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 0 days.

(21) Appl. No.: 15/550,328

(22) PCT Filed: Feb. 26, 2016

(86) PCT No.: PCT/EP2016/054131
§ 371 (c)(1),
(2) Date: Aug. 10, 2017

(87) PCT Pub. No.: WO2016/135312
PCT Pub. Date: Sep. 1, 2016

(65) Prior Publication Data
US 2018/0025499 A1    Jan. 25, 2018

(30) Foreign Application Priority Data

Feb. 27, 2015 (GB) .................................... 1503383.0

(51) Int. Cl.
*G06T 7/277* (2017.01)
*G06T 7/215* (2017.01)
(Continued)

(52) U.S. Cl.
CPC .............. *G06T 7/277* (2017.01); *B60D 1/245* (2013.01); *B60D 1/327* (2013.01); *B60R 1/003* (2013.01);
(Continued)

(58) Field of Classification Search
CPC ........ B60D 1/245; B60D 1/327; B60R 1/003; B60R 2300/101; B60R 2300/806;
(Continued)

(56) References Cited

U.S. PATENT DOCUMENTS 8,842,176 B2 * 9/2014 Schofield .................. B60R 1/00
348/113
9,156,496 B2 * 10/2015 Greenwood .............. B60R 1/00
(Continued)

FOREIGN PATENT DOCUMENTS

DE    10 2011 104 256 A1    7/2012
DE    10 2011 101 990 B3    10/2012
(Continued)

OTHER PUBLICATIONS

Patents Act 1977: Combined Search and Examination Report under Sections 17 and 18(3), GB Application No. GB1503383.0, dated Aug. 7, 2015, 8 pp.
(Continued)

*Primary Examiner* — Nader Bolourchi
(74) *Attorney, Agent, or Firm* — Myers Bigel, P.A.

(57) ABSTRACT

The present disclosure relates to a trailer tracking apparatus (2) for monitoring movement of a trailer (3) connected to a vehicle (1). The trailer tracking apparatus (2) has a controller (5) comprising an electronic processor (6) having an electrical input for receiving image data (DAT) from an imaging sensor (10) disposed on the vehicle (1). An electronic memory device (7) having instructions stored therein is electrically coupled to the electronic processor (6). The electronic processor (6) is configured to access the memory device (7) and to execute the instructions stored therein. The electronic processor (6) is operable to select a subset of said image data ($DAT_{SUB1}$). One or more element (16) are detected and monitored within the selected subset ($DAT_{SUB1}$) of said image data (DAT). The electronic processor (6) determines movement of the trailer (3) relative to the vehicle (1) in dependence on evolution of said one or more detected element (16) with respect to time. The present disclosure
(Continued)

also relates to a method of tracking a trailer (3); and to a vehicle (1) incorporating the trailer tracking apparatus (2).

20 Claims, 3 Drawing Sheets

(51) Int. Cl.
*B60D 1/24* (2006.01)
*B60D 1/32* (2006.01)
*B60R 1/00* (2006.01)
*B60W 50/14* (2012.01)
*B62D 13/06* (2006.01)
*B62D 15/02* (2006.01)

(52) U.S. Cl.
CPC ............ *B60W 50/14* (2013.01); *B62D 13/06* (2013.01); *B62D 15/027* (2013.01); *G06T 7/215* (2017.01); *B60R 2300/101* (2013.01); *B60R 2300/806* (2013.01); *B60W 2520/22* (2013.01); *G06T 2207/10016* (2013.01); *G06T 2207/20104* (2013.01); *G06T 2207/30252* (2013.01)

(58) Field of Classification Search
CPC ... B60W 2520/22; B60W 50/14; B62D 13/06; B62D 15/027; G06T 2207/10016; G06T 2207/20104; G06T 2207/30252; G06T 7/215; G06T 7/277
See application file for complete search history.

(56) References Cited

U.S. PATENT DOCUMENTS

| | | | | |
|---|---|---|---|---|
| 9,296,422 B2* | 3/2016 | Lavoie | ................... | B62D 13/06 |
| 9,464,886 B2* | 10/2016 | Salter | ................. | H05B 37/0218 |
| 9,464,887 B2* | 10/2016 | Salter | ................. | H05B 37/0218 |
| 9,500,497 B2* | 11/2016 | Lavoie | ............... | G01C 21/3676 |
| 9,506,774 B2* | 11/2016 | Shutko | ............... | G01C 21/3647 |
| 9,517,668 B2* | 12/2016 | Lavoie | ................... | B60D 1/305 |
| 9,555,832 B2* | 1/2017 | Smit | ..................... | B62D 13/06 |
| 9,683,848 B2* | 6/2017 | Lavoie | ................ | G01C 21/165 |
| 9,723,274 B2* | 8/2017 | Lavoie | .................... | H04N 7/183 |
| 9,963,004 B2* | 5/2018 | Lavoie | ................... | B60D 1/305 |
| 9,971,943 B2* | 5/2018 | Greenwood | .............. | B60R 1/00 |
| 2014/0085472 A1 | 3/2014 | Lu et al. | | |
| 2014/0267688 A1* | 9/2014 | Aich | ..................... | H04N 7/181 348/113 |
| 2015/0203128 A1* | 7/2015 | Strano | ..................... | B60D 1/30 340/431 |

FOREIGN PATENT DOCUMENTS

DE   10 2011 113 191 A1   3/2013
GB        2505666 A        3/2014

OTHER PUBLICATIONS

International Search Report and Written Opinion of the International Searching Authority, International Application No. PCT/EP2016/054131, dated Jul. 8, 2016, 17 pp.

Sun et al., "On-Road Vehicle Detection: A Review", *IEEE Transactions on Pattern Analysis and Machine Intelligence*, vol. 28, No. 5, May 2006, pp. 694-711.

Winner et al. "Handbuch Fahrerassistenzsysteme: Grundlagen, Komponenten und Systeme für aktive Sicherheit und Komfort, Chapter 15: Maschinelles Sehen", Jan. 1, 2009 (Jan. 1, 2009), Handbuch Fahrerassistenzsysteme : Grundlagen, Komponenten und Systeme fur Aktive Sicherheit und Komfort, Vieweg + Teubner, Wiesbaden, pp. 216-219, XP002730622, ISBN: 978-3-8348-0287-3, section "15.5.2.1"; p. 216, p. 217, right-hand column, lines 15-21.

* cited by examiner

TRAILER TRACKING APPARATUS AND METHOD

RELATED APPLICATIONS

This application is a 35 U.S.C. § 371 national stage application of PCT Application No. PCT/EP2016/054131, filed on Feb. 26, 2016, which claims priority from Great Britain Patent Application No. 1503383.0 filed on Feb. 27, 2015, the contents of which are incorporated herein by reference in their entireties. The above-referenced PCT International Application was published in the English language as International Publication No. WO 2016/135312 A1 on Sep. 1, 2016.

TECHNICAL FIELD

The present disclosure relates to a trailer tracking apparatus and method. More particularly, but not exclusively, the present disclosure relates to a trailer tracking apparatus, to a vehicle incorporating a trailer tracking apparatus, and to a method of tracking a trailer.

BACKGROUND

It is known to use an imaging sensor to track movements of a trailer connected to a vehicle. In order to accurately to track the trailer, prior art systems require that a target is mounted to the front of the trailer. The target can, for example, take the form of three circles arranged in a triangular configuration. An optical camera mounted to the vehicle identifies the target and tracks its movement relative to the vehicle. There are certain shortcomings associated with these prior art systems, notably the requirement that the target is fitted to the vehicle. The initial setup of the trailer tracking system can be time-consuming. In order to track the trailer, the target must be installed in a specified location on the trailer, but this may not be possible depending on the configuration of the trailer. Furthermore, accuracy of the prior art systems may be affected in the low visibility conditions meaning that certain control functions may not be available.

It is against this background that the present invention has been conceived. At least in certain embodiments, the method and apparatus described herein seek to overcome or ameliorate at least some of the shortcomings associated with prior art systems.

SUMMARY OF THE INVENTION

Aspects of the present invention relate to a trailer tracking apparatus, to a vehicle incorporating a trailer tracking apparatus, and to a method of tracking a trailer.

According to a further aspect of the present invention there is provided a trailer tracking apparatus for monitoring movement of a trailer connected to a vehicle. The trailer tracking apparatus may comprise a controller comprising an electronic processor having an electrical input for receiving image data from an imaging sensor disposed on the vehicle. The trailer tracking apparatus may comprise an electronic memory device electrically coupled to the electronic processor and having instructions stored therein. The electronic processor may be configured to access the memory device and execute the instructions stored therein such that it is operable to select a subset of said image data and/or detect and monitor one or more element within the selected subset of said image data and/or determine movement of the trailer relative to the vehicle in dependence on evolution of said one or more detected element with respect to time. The apparatus may predict the movement of active contours and features of the trailer based on at least a probabilistic assessment.

The evolution of said one or more element provides an indication of the movement of the trailer relative to the vehicle. The evolution of the said one or more element may be in dependence on the statistical probability. At least in certain embodiments, the trailer tracking apparatus may track the trailer without requiring provision of a target thereon. In other words, the trailer tracking apparatus may perform target-less tracking of a trailer. A trailer setup procedure may be simplified when the trailer is connected to the vehicle. The image data corresponds to an image generated by the imaging sensor; and the subset of said image data corresponds to a defined region within said image.

The trailer tracking apparatus may be configured to output a tracking signal. The tracking signal may be used by other vehicle systems, for example to facilitate hitching and towing of the trailer. The tracking signal could also be used to facilitate reversing the trailer when connected to the vehicle. The tracking signal may also be used to monitor trailer stability etc.

In order to enable tracking of the trailer, the selected subset of said image data may comprise at least a portion of the trailer contained within the image data. The electronic processor may be configured to characterise each detected element as a persistent element or as a transient element.

The evolution of said one or more element may comprise one or more of the following: acceleration, velocity, angular velocity, angular acceleration, movement, size, shape and orientation. The electronic processor may be configured to determine movement of the trailer in dependence on the evolution of each persistent element.

The electronic processor may be configured to modify the selected subset of said image data to include image data representing one or more persistent element. Thus, if the electronic processor determines that the selected subset of said image data does not comprise any persistent elements, a modified or alternative subset of said image data may be selected. The electronic processor may be configured to disregard any transient elements since these typically correspond to features other than the trailer, for example other vehicles or features in the background, which are unrelated to the movement of the trailer.

The electronic processor may be configured to disregard any transient elements identified within the selected subset of said image data. The electronic processor may be configured to modify the selected subset of said image data to exclude each transient element. The electronic processor could, for example, determine that a localised area containing transient elements corresponds to a region offset from the trailer. The electronic processor could exclude that the localised area from analysis to track movements of the trailer. The electronic processor could, for example, be configured automatically to redefine the selected region of said image data.

The electronic processor may be configured to receive a user input to select said subset of the image data. For example, the user may define a window or frame on a graphical display of said image data. The graphical display could be a touch screen to facilitate definition of said window or a frame. Alternatively, a separate controller could be used to define the extent of the window or a frame.

In a variant, the electronic processor may be configured to select said subset of the image data. The subset of the image data could be selected for a predefined region of the image data. Alternatively, the subset could be selected dynamically, for example by identifying persistent elements within a localised area. The electronic processor could be configured to redefine the region of the image data if the selected region does not contain adequate persistent elements to track movement of the trailer.

According to a still further aspect of the present invention there is provided a trailer tracking apparatus for monitoring movement of a trailer connected to a vehicle. The trailer tracking apparatus may comprise a controller comprising an electronic processor having an electrical input for receiving image data from an imaging sensor disposed on the vehicle. The trailer tracking apparatus may comprise an electronic memory device electrically coupled to the electronic processor and having instructions stored therein. The electronic processor may be configured to access the memory device and execute the instructions stored therein such that it is operable to detect one or more element within said image data and/or monitor said one or more element and characterise said one or more element as a persistent element or a transient element and/or determine movement of the trailer relative to the vehicle in dependence on the evolution of each persistent element with respect to time.

According to a yet further aspect of the present invention there is provided a vehicle comprising a trailer tracking apparatus as described herein.

According to a further aspect of the present invention there is provided a method of monitoring movement of a trailer connected to a vehicle. The method may comprise receiving image data from an imaging sensor. The method may comprise selecting a subset of said image data. The method may comprise detecting and monitor one or more element within the selected subset of said image data. The method may comprise determining movement of the trailer relative to the vehicle in dependence on evolution of said one or more detected element with respect to time.

The method may comprise characterising each detected element as a persistent element or a transient element. The movement of the trailer may be determined in dependence on the evolution of each persistent element.

The method may comprise modifying the selected subset of said image data to include image data representing one or more persistent element. The method may comprise disregarding each transient element.

The method may comprise modifying the selected subset of said image data to exclude each transient element.

The evolution of said one or more element may comprise one or more of the following: acceleration, velocity, angular velocity, angular acceleration, movement, size, shape and orientation.

The method may comprise selecting said subset of the image data in dependence on a user input. The user may, for example, use a human machine interface to define the subset. Alternatively, the method may comprise automatically selecting said subset of the image data.

According to a yet further aspect of the present invention there is provided a method of monitoring movement of a trailer connected to a vehicle. The method may comprise receiving image data from an imaging sensor. The method may comprise detecting one or more element within said image data. The method may comprise characterising said one or more element as a persistent element or a transient element. The method may comprise determining movement of the trailer relative to the vehicle in dependence on the evolution of each persistent element with respect to time.

Within the scope of this application it is expressly intended that the various aspects, embodiments, examples and alternatives set out in the preceding paragraphs, in the claims and/or in the following description and drawings, and in particular the individual elements thereof, may be taken independently or in any combination. That is, all embodiments and/or elements of any embodiment may be combined in any way and/or combination, unless such elements are incompatible. The applicant reserves the right to change any originally filed claim or file any new claim accordingly, including the right to amend any originally filed claim to depend from and/or incorporate any element of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

Figure 1:
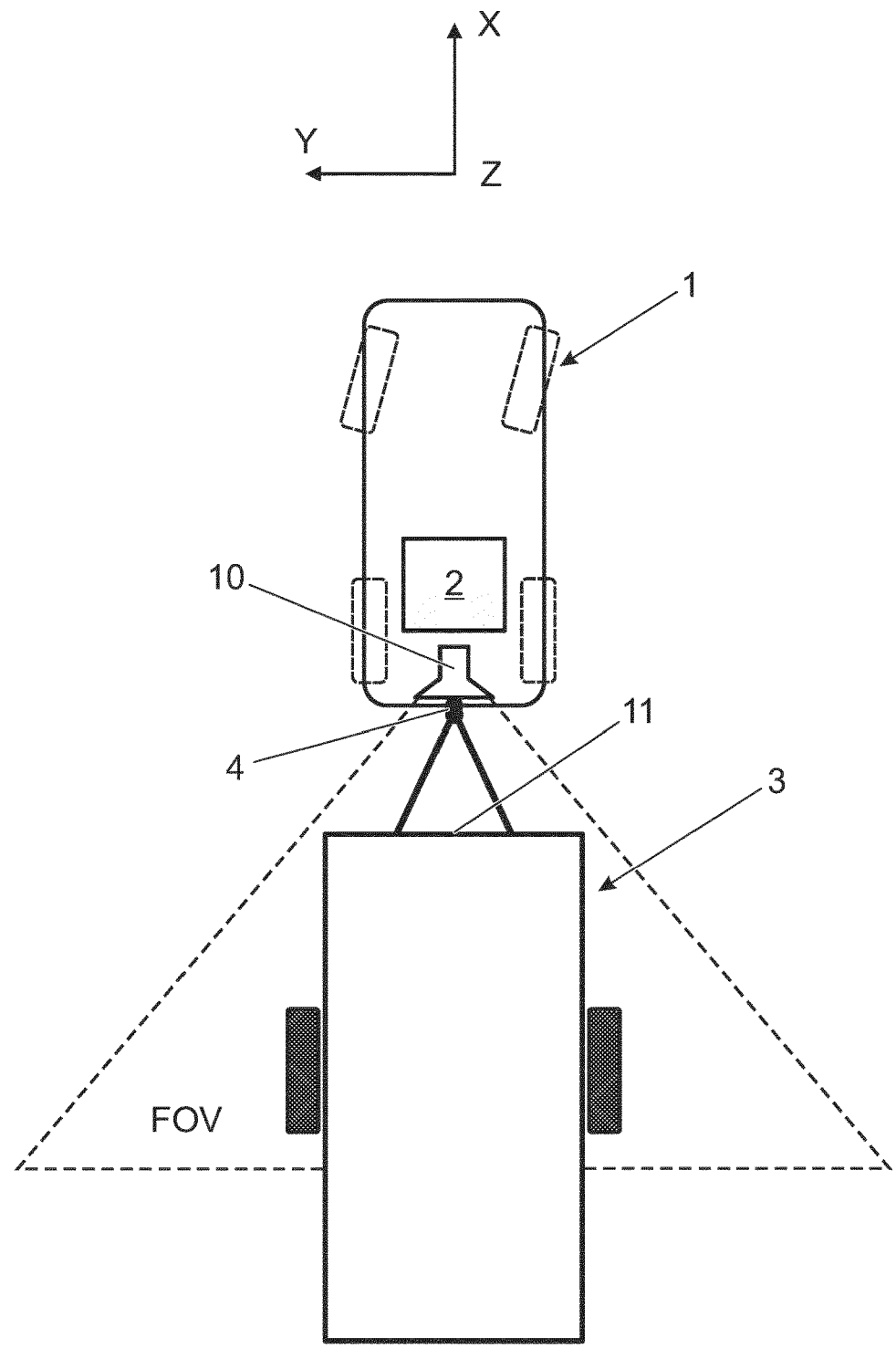
FIG. 1 shows a schematic representation of a vehicle having a trailer tracking apparatus in accordance with an embodiment of the present invention.

A vehicle 1 incorporating a trailer tracking apparatus 2 in accordance with an embodiment of the present invention will now be described by way of example. The vehicle 1 is connected to a trailer 3, as illustrated in FIG. 1. As described herein, the trailer tracking apparatus 2 is disposed in the vehicle 1 to track movement of the trailer 3.

The vehicle 1 in the present embodiment is an automobile, but it will be appreciated that the present invention is not limited in this respect. For example, the trailer tracking apparatus 2 could be incorporated into a tractor unit. Furthermore, the trailer 3 in the present embodiment is illustrated as a caravan, but it will be appreciated that the present invention is not limited in this respect. For example, the trailer 3 could be a horse trailer or a box trailer.

As shown in FIG. 1, the trailer 3 is pivotally connected to a connector 4. The connector for is mounted centrally at the rear of the vehicle 1 coincident with a central original axis X of the vehicle 1. The connector 4 in the present embodiment is in the form of a hitch ball connector which allows the trailer 3 to pivot about a vertical axis Z1. The connector 4 also allows a limited rotational movement of the trailer 3 about a longitudinal axis X1, and a transverse axis Y1. It will be appreciated that the connector 4 could take a variety of forms, for example a towbar ring, a pintle hook, a ball pintle hook, a clevis hitch, a ball and pin towing hitch.

Figure 2:
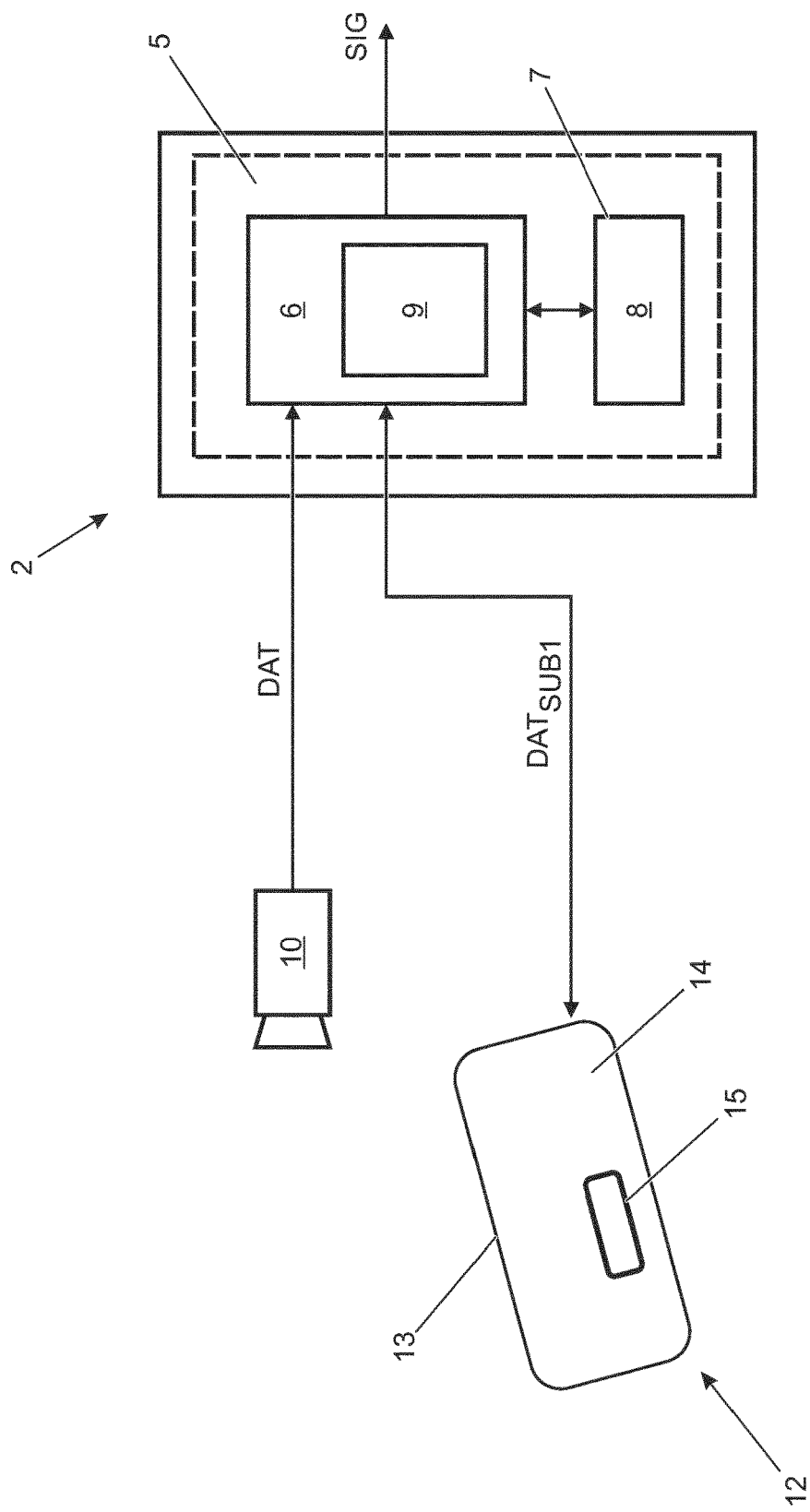
FIG. 2 shows a schematic representation of the vehicle and the trailer tracking apparatus shown in FIG. 1.

A schematic representation of the trailer tracking apparatus 2 is shown in FIG. 2. The trailer tracking apparatus 2 comprises a controller 5 having one or more electronic processor 6 (only one is shown for simplicity of explanation) and system memory 7 having computer code 8 stored thereon. As described herein, the electronic processor 6 is operative to implement an image processing module 9 configured to analyse image data DAT received from an imaging sensor 10. The imaging sensor 10 is in the form of an optical camera. The imaging sensor 10 is rearward facing and is arranged such that its field of view includes a front portion 11 of the trailer 3 (when the trailer 3 is connected to the vehicle 1). The imaging sensor 10 is operative to provide a video image to enable changes in the relative position of the trailer 3 to be determined, as described herein. It will be appreciated that the image sensor 10 could provide additional functions, for example as a parking aid for the vehicle 1.

The imaging sensor 10 transmits the image data DAT to the electronic processor 6 over a vehicle communication network, such as a communication area network (CAN) bus. The image processing module 9 receives the image data DAT and a first subset $DAT_{SUB1}$, of the image data DAT is selected for analysis. The first subset $DAT_{SUB1}$, corresponds to a portion of the image captured by the imaging sensor 10 and is intended to capture a section of the front portion 11 of the trailer 3. The first subset $DAT_{SUB1}$, can be selected automatically, for example corresponding to a predefined region of the image; or can be selected by a user, for example using a human machine interface (HMI) 12. In the present embodiment, the trailer tracking apparatus 2 is configured to receive user inputs via the HMI 12 to select the first subset $DAT_{SUB1}$. The HMI 12 comprises a display screen 13 (such as a liquid crystal display) to which the image data DAT is output in the form of an image 14. The user is prompted to select a region of the image 14 which includes at least a portion of the trailer 3 visible in said image 14. The user can, for example, use a touch-screen interface to trace a window 15 within the image 14. The first subset $DAT_{SUB1}$, corresponds to the region selected by the user.

The image processing module 9 implements an image processing algorithm to track movement of the trailer 3. In particular, the image processing module 9 analyses the first subset $DAT_{SUB1}$ to identify at least one element 16 which can be tracked with respect to time.

The analysis of the first subset $DAT_{SUB1}$ can comprise applying a mathematical operator to identify said at least one element 16. The mathematical operator can be in the form of a filter, for example a "particle filter", suitable for tracking and predicting the movements of active contours and features in the real image. The mathematical operator can thereby estimate the model configuration that at least substantially matches the current observations. In the present embodiment, the image processing module 9 is configured to identify a plurality of said elements 16 each corresponding to a visible feature within the image. The elements 16 can each correspond to one or more pixels defined by the image data DAT. In the context of analysing the image data DAT, each element 16 identified by the image processing module 9 can be referred to as a particle. By analysing the first subset $DAT_{SUB1}$, with respect to time, the image processing module 9 can monitor particle evolution. The particle evolution can, for example, be tracked by identifying the particle state $S_t$ in an image scan at time t, and the related state $S_{t+1}$, in a subsequent scan at time t+1. By comparing the properties of the states $S_t$ and $S_{t+1}$, the image processing module 9 can monitor particle evolution. The particle evolution can, for example, identify one or more of the following: position, size, trajectory and orientation.

The image processing module 9 is configured to select those elements 16 which are identifiable within the first subset $DAT_{SUB1}$, for a time period longer than a predetermined time threshold (or in a series of scanning cycles greater than a predetermined scanning threshold); these elements 16 are referred to herein as "persistent elements". The image processing module 9 can also analyse the first subset $DAT_{SUB1}$, to identify those elements 16 which are identifiable only for a time period less that the predetermined time threshold (or in a series of scanning cycles less than the predetermined scanning threshold); these elements 16 are referred to herein as "transient elements". The image processing module 9 characterises the elements 16 as either persistent elements 16P or transient elements 16T. There is a higher statistical probability that the persistent elements 16P correspond to a feature of the trailer 3 (since they are present for an extended time period and are more likely to form part of the trailer 3 being towed behind the vehicle 1). The transient elements 16T are more likely to represent a feature away from the trailer 3, for example in the scenery or another vehicle, which may be visible only fleetingly or over a short time period. Thus, there is a lower statistical probability that the transient elements 16T correspond to a element forming part of the trailer 3 (since they are present for a relatively short time period). The image processing module 9 can be configured to disregard any transient elements 16T identified in the first subset $DAT_{SUB1}$. Further analysis of the first subset $DAT_{SUB1}$, can be performed in respect of the persistent elements 16P.

The image processing module 9 identifies and monitors the persistent elements 16P to track their evolution (progression) with respect to time, for example over a plurality of scan cycles. The evolution of the persistent elements 16P in the present embodiment comprises their movement trajectories (direction and magnitude) which can be used to track the movement of the trailer 3. For example, a vertical or lateral movement of one or more persistent element 16P can correspond respectively to a vertical or lateral movement of the trailer 3. A combination of vertical and lateral movements can indicate a pivoting movement of the trailer 3 about the vertical axis Z.

The image processing module 9 can determine the spatial location of each persistent element 16P and this can be used to determine the associated movement of the trailer 3. For example, the movement trajectory of each persistent element 16P can be mapped to a reference datum (such as a known spatial position of the connector 4) to identify a pivoting movement of the trailer 3. The image processing module 9 could optionally compare relative movement trajectories of several of said persistent elements 16P identified within the first subset $DAT_{SUB1}$.

Alternatively, or in addition, the evolution of each persistent element 16P can comprise changes in the size of said one or more persistent element 16P. A change in the size of the persistent element 16P can also indicate a pivoting movement of the trailer 3. For example, the size of a persistent element 16P will increase or decrease depending on the direction in which the trailer 3 pivots.

Alternatively, or in addition, the evolution of each persistent element 16P can comprise changes in the shape and/or orientation of the persistent element 16P. The image processing module 9 could, for example, identify a persistent element 16P having a clearly defined feature (for example corresponding to an edge of a window in the front portion 11 of the trailer 3). The change in the shape and/or orientation of the persistent element 16P could be used to track movement of the trailer 3. The image processing module 9 tracks the trailer 3 and outputs a tracking signal SIG. The tracking signal SIG 1 can be used by other vehicle systems, for example to assist with towing, stability, hitching and manoeuvring.

If the image processing module 9 is unable to identify any persistent elements 16P within the region of the image 14 selected by the user, a notification can be output to the user. For example, the electronic processor 6 can output a prompt to the user to re-select the region of the image 14 by re-tracing the window 15 on the display screen 13. A second data subset $DAT_{SUB2}$ can be selected form the image data DAT in dependence on the re-selected region of the image 14. The image processing module 9 repeats the analysis in respect of said second data subset $DAT_{SUB2}$.

Figure 3:
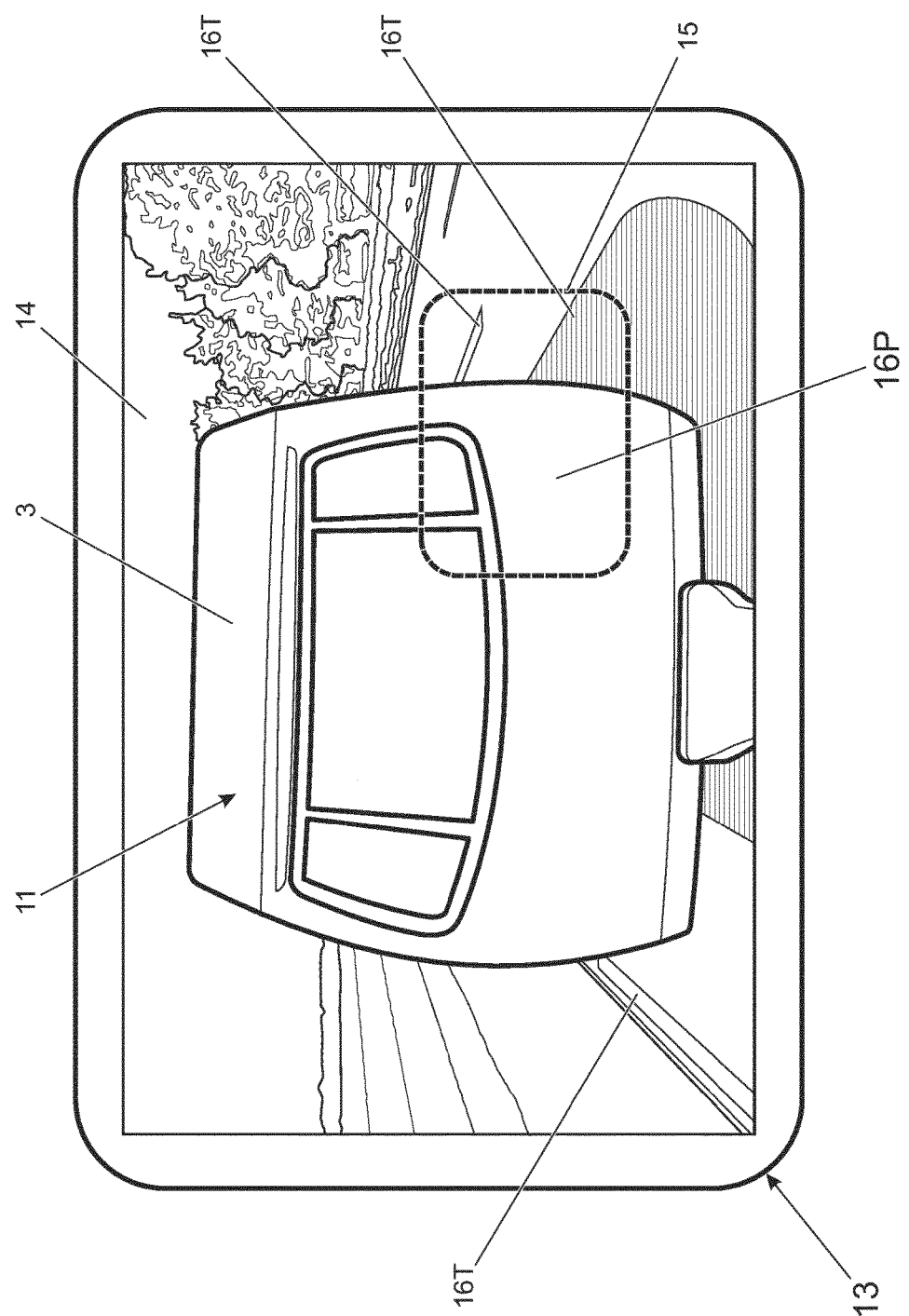
FIG. 3 illustrates processing of the image data by the trailer tracking apparatus in accordance with an embodiment of the present invention.

The operation of the image processing module 9 will now be described with reference to FIG. 3. The trailer 3 is connected to the connector 4 in conventional manner. The imaging sensor 10 generates image data DAT which is output to the electronic processor 6. An image 14 corresponding to a field of view FOV of the imaging sensor 10 is also output to the display screen 13. The user uses the HMI 12 to trace the window 15 to select a region of the image 14. The window 15 should be traced to cover at least a portion of the trailer 3 and an on-screen prompt can be displayed to the user. A first data subset $DAT_{SUB1}$ is extracted from the image data DAT corresponding to the region selected by the user. The image processing module 9 analyses the first data subset $DAT_{SUB1}$ to identify a plurality of elements 16 contained therein. The image processing module 9 analyses the elements 16 and characterises them as either persistent elements 16P or transient elements 16T. The image processing module 9 tracks the persistent elements 16P with respect to time to monitor their evolution. The evolution of the persistent elements 16P can, for example, comprise changes in shape and/or position and/or movement. The evolution of the persistent elements 16P is used to track the movement of the trailer 3 relative to the vehicle 1. The image processing module 9 outputs a tracking signal SIG which can be used by other vehicle systems to facilitate towing of the trailer 3. If the image processing module 9 determines that the first data subset $DAT_{SUB1}$, does not contain sufficient persistent elements 16P for reliable analysis, a prompt can be output to request that the user selects an alternate region within the image 14.

It will be appreciated that various changes and modifications can be made to the trailer tracking apparatus 2 described herein. For example, the electronic processor 6 can be configured automatically to select the first data subset $DAT_{SUB1}$, from the image data DAT generated by the imaging sensor 10. Furthermore, the electronic processor 6 can be configured to receive dynamic operating parameters from the communication network which could be used in the analysis of the first data subset $DAT_{SUB1}$. The dynamic operating parameters could, for example, comprise one or more of the following: vehicle speed, acceleration and steering angle. The electronic processor 6 could, for example, be configured to select the first data subset $DAT_{SUB1}$ from a region of the image data DAT in dependence on the steering angle in order to reduce the likelihood of selecting a portion of the background. Alternatively, or in addition, the image processing module 9 could be configured to analyse the first data subset $DAT_{SUB1}$ to identify persistent elements 16P only when the vehicle 1 is moving (i.e. the vehicle speed is greater than 0). Alternatively, or in addition, the image processing module 9 could be configured to correlate movements of each persistent element 16P identified in the image data DAT with the steering angle of the vehicle 1. A further possibility would be to determine one or more characteristics of the trailer 3, for example wheelbase and or length, by comparing the response of the trailer 3 to steering inputs to the vehicle 1.

The invention claimed is:

1. A trailer tracking apparatus for monitoring movement of a trailer connected to a vehicle, the trailer tracking apparatus comprising:
a controller comprising an electronic processor having an electrical input for receiving image data from an imaging sensor disposed on the vehicle; and
an electronic memory device electrically coupled to the electronic processor and having instructions stored therein;
wherein the electronic processor is configured to access the memory device and execute the instructions stored therein such that it is operable to:
select a subset of the image data;
detect and monitor one or more elements within the selected subset of the image data;
characterize each of the one or more detected elements as a persistent element or a transient element; and
determine movement of the trailer relative to the vehicle in dependence on evolution of the one or more detected persistent elements with respect to time;
wherein the electronic processor is configured automatically to redefine the selected subset of the image data to include image data representing one or more persistent elements of said image data.

2. A vehicle comprising a trailer tracking apparatus as claimed in claim 1.

3. The trailer tracking apparatus as claimed in claim 1, wherein the electronic processor is operable to characterize each of the one or more elements identifiable within the image data for a time period longer than a predetermined time threshold as the persistent element and characterize each of the one or more elements identifiable within the image data for a time period less than the predetermined time threshold as the transient element.

4. A trailer tracking apparatus for monitoring movement of a trailer connected to a vehicle, the trailer tracking apparatus comprising:
a controller comprising an electronic processor having an electrical input for receiving image data from an imaging sensor disposed on the vehicle; and
an electronic memory device electrically coupled to the electronic processor and having instructions stored therein;
wherein the electronic processor is configured to access the memory device and execute the instructions stored therein such that it is operable to:
detect one or more elements within the image data;
monitor the one or more elements and characterize each of the one or more elements identifiable within the image data for a time period longer than a predetermined time threshold as a persistent element and characterize each of the one or more elements identifiable within the image data for a time period less than the predetermined time threshold as a transient element; and
determine movement of the trailer relative to the vehicle in dependence on evolution of each persistent element with respect to time.

5. The trailer tracking apparatus as claimed in claim 4, wherein the evolution of each persistent element comprises a movement trajectory including direction and magnitude, wherein the movement trajectory is used to track the movement of the trailer.

6. The trailer tracking apparatus as claimed in claim 5, wherein the electronic processor is further configured to compare relative movement trajectories of several of the persistent elements.

7. A vehicle comprising the trailer tracking apparatus as claimed in claim 4.

8. The trailer tracking apparatus as claimed in claim 4, the electronic processor is operable to select a subset of the image data; and to detect and monitor the one or more element within the selected subset of the image data.

9. The trailer tracking apparatus as claimed in claim 8, wherein the electronic processor is configured to modify the selected subset of the image data to include image data representing one or more persistent element; and/or modify the selected subset of the image data to exclude each transient element.

10. The trailer tracking apparatus as claimed in claim 4, wherein the evolution of the one or more element comprises one or more of the following: acceleration, velocity, angular velocity, angular acceleration, movement, size, shape and orientation.

11. The trailer tracking apparatus as claimed in 34, wherein the electronic processor is configured to receive a user input to select the subset of the image data.

12. The trailer tracking apparatus as claimed in claim 8, wherein the electronic processor is configured automatically to select the subset of the image data.

13. A method of monitoring movement of a trailer connected to a vehicle, the method comprising:

receiving image data from an imaging sensor;

detecting one or more elements within the image data;

characterizing each of the one or more elements identifiable within the image data for a time period longer than a predetermined time threshold as a persistent element and characterizing each of the one or more elements identifiable within the image data for a time period less than the predetermined time threshold as a transient element; and determining movement of the trailer relative to the vehicle in dependence on evolution of each persistent element with respect to time.

14. The method as claimed in claim 13, further comprising:

selecting a subset of the image data; and detecting and monitoring the one or more elements within the selected subset of the image data.

15. The method as claimed in claim 14, further comprising:

modifying the selected subset of the image data to include image data representing one or more persistent elements; and/or modifying the selected subset of the image data to exclude each transient element.

16. The method as claimed in claim 13, wherein the evolution of each persistent element comprises one or more of the following: acceleration, velocity, angular velocity, angular acceleration, movement, size, shape and orientation.

17. The method as claimed in claim 13, wherein the evolution of each persistent element comprises a movement trajectory including direction and magnitude, wherein the movement trajectory is used to track the movement of the trailer.

18. The method as claimed in claim 17, further comprising comparing relative movement trajectories of several of the persistent elements.

19. The method as claimed in 26, further comprising selecting the subset of the image data in dependence on a user input.

20. The method as claimed in claim 13, further comprising automatically selecting the subset of the image data.

* * * * *

UNITED STATES PATENT AND TRADEMARK OFFICE
CERTIFICATE OF CORRECTION

PATENT NO. : 10,181,196 B2  
APPLICATION NO. : 15/550328  
DATED : January 15, 2019  
INVENTOR(S) : Strano et al.

Page 1 of 1

It is certified that error appears in the above-identified patent and that said Letters Patent is hereby corrected as shown below:

In the Claims

Column 9, Line 17, Claim 11: Please correct "34" to read -- 8 --

Column 10, Line 28, Claim 19: Please correct "26" to read -- 13 --

Signed and Sealed this
Sixteenth Day of April, 2019

Andrei Iancu
*Director of the United States Patent and Trademark Office*